United States Patent [19]

Nakano et al.

[11] 4,369,092
[45] Jan. 18, 1983

[54] PROCESS FOR REMOVING MONOMER FROM VINYL CHLORIDE RESIN SLURRY BY STEAM TREATMENT AND APPARATUS EMPLOYED THEREFOR

[75] Inventors: Kazuaki Nakano; Masaaki Fukuda; Kyuichi Mito, all of Minamatashi; Mikio Shinkai, Chibashi; Shiro Aruga, Tokyo, all of Japan

[73] Assignee: Chisso Corporation, Osaka, Japan

[21] Appl. No.: 173,722

[22] Filed: Jul. 30, 1980

[30] Foreign Application Priority Data

Aug. 1, 1979 [JP] Japan .................................. 54/98306

[51] Int. Cl.$^3$ ............................................. B01D 1/14
[52] U.S. Cl. ................................... 159/47.1; 159/165; 159/DIG. 10; 528/500; 134/198
[58] Field of Search ................. 159/165, DIG. 10, 47; 528/500, 499, 501; 134/172, 166 R, 166 C, 198, 38, 22; 210/409, 411, 412

[56] References Cited

U.S. PATENT DOCUMENTS

| | | | |
|---|---|---|---|
| 748,821 | 1/1904 | Wackerow | 210/411 |
| 2,511,817 | 6/1950 | Sheldon | 134/198 |
| 2,844,568 | 7/1958 | Mertz | 159/DIG. 10 |
| 3,108,608 | 10/1963 | Mahowald | 134/198 |
| 3,112,263 | 11/1963 | Ellila | 210/411 |
| 3,398,831 | 8/1968 | Jones | 210/409 |
| 4,228,273 | 10/1980 | Hughes | 528/500 |

FOREIGN PATENT DOCUMENTS 20652 of 1913 United Kingdom ................ 210/411

*Primary Examiner*—Norman Yudkoff
*Attorney, Agent, or Firm*—Fred Philpitt

[57] ABSTRACT

When vinyl chloride resin slurry containing vinyl chloride monomer is contacted with steam in counterflow manner in a column provided with at least one perforated plate having a downcomer to remove the monomer, the lower surface of the plate is washed by hot water injection, whereby clogging of the small holes of the perforated plate is prevented.

14 Claims, 5 Drawing Figures

PROCESS FOR REMOVING MONOMER FROM VINYL CHLORIDE RESIN SLURRY BY STEAM TREATMENT AND APPARATUS EMPLOYED THEREFOR

BACKGROUND OF THE INVENTION

1. Field of the Invention

This invention relates to an improvement in the process for removing vinyl chloride monomer from vinyl chloride resin slurry containing the same by blowing steam into the slurry flowing down through the inside of a column provided with perforated plates and downcomers therein. More particularly it relates to a process for preventing the obstacles of the perforated plates such as adhesion of vinyl chloride resin powder onto the lower surface of the plates or clogging of the holes thereof, by washing with hot water, and a hot water washing apparatus therefor.

2. Description of the Prior Art

Vinyl chloride resin slurry is usually produced by polymerizing vinyl chloride monomer in the state of suspension or emulsion in an aqueous medium and after completion of the polymerization, separating and recovering unreacted monomer. The resulting vinyl chloride resin slurry is then subjected to mechanical separation of the aqueous medium, followed by drying by hot air drying or other means to give vinyl chloride resin powder.

However, the above-mentioned separated aqueous medium, exhaust gas during the hot air drying and further the dried vinyl chloride resin powder, each contain vinyl chloride monomer in an extent of amount which is liable to raise a problem by reason of environmental health or is apparently regarded as harmful.

Various processes have been proposed for completely removing vinyl chloride monomer contained in such exhausts or vinyl chloride resin powder or reducing its content down to a harmless extent with respect of environmental health.

Among the processes, a process is known wherein vinyl chloride resin slurry is flowed down from the upper part of a column provided with perforated plates and downcomers; and the slurry is treated with steam blown through small holes in the perforated plates to vaporize vinyl chloride monomer contained in the resin powder or resin slurry along with steam (West German patent applications laid-open Nos. P 2640546 and P 2806694).

Such a process employing perforated plates equipped with downcomers has a merit that the diameter of the small holes is smaller and hence the amount of steam consumed is smaller, over processes employing perforated plates without any downcomer. Further, in the above process of West German patent application laid-open No. P 2806694, side plates are stood on the perforated plates for form a groove-shaped flow path, and the vinyl chloride resin slurry is flowed through the groove-shaped flow path practically in a state of piston-flow, and the process has a merit that the width of retention time distribution can be narrowed.

However, in these steam-treating processes employing a column provided with perforated plates having downcomers, particularly in the process of the above West German patent application laid-open No. P 2806694 (invented also by the present inventors), the following various problems to be solved have been raised;

The small holes of the perforated plates are gradually clogged during the above treatment, and before long, a back flow of vinyl chloride resin slurry through the downcomers occurs, resulting in infeasibility of the treatment.

The present inventors have made strenuous studies for overcoming these problems, and observed that in the case of clogging of the holes of perforated plates, a vermicelli-like mass of vinyl chloride resin powder, protruded upwards from the inside of the holes, is often formed. In view of this fact, the cause of clogging of the holes of perforated plates has been presumed to consist in that vinyl chloride resin particles adhered onto the sidewall constituting the holes or onto the lower surface of perforated plates in the vicinity of the holes, soften, and are gradually sucked toward the holes by steam passing through the holes and further pushed upwards inside the holes, while softening of the particles advances to cause adhesion to each other, resulting in the above-mentioned vermicelli-like mass which clogs the holes.

The present inventors have found that if the lower surface of the perforated plates provided in the above-mentioned column is sufficiently washed with hot water during the steam treatment of vinyl chloride resin slurry in the column, remarkable effectiveness is attained in the solution of the above-mentioned problems.

In addition, the above-mentioned West German patent application laid-open No. P 2806694 discloses a piping for washing the inside of the column, but this shows nothing but a general concept of washing the inside of the column. On the other hand, the present invention discloses that washing of the lower surface of the perforated plates with hot water under specified conditions is notably effective for preventing the holes of the perforated plates from clogging.

SUMMARY OF THE INVENTION

The present invention resides in:

In the process for removing vinyl chloride monomer (abbreviated hereinafter to VC monomer) from vinyl chloride resin slurry (hereinafter abbreviated merely to slurry), by feeding said slurry into a vessel (including a column) provided with at least one perforated plate having a number of small holes and needing a flowing-out path of the slurry therefrom other than the small holes, and treating said slurry on said perforated plate with steam blown through the small holes from downwards, the improvement which comprises washing the lower surface of said perforated plate with hot water injected toward said surface during said treatment.

DESCRIPTION OF THE PREFERRED EMBODIMENTS

The above-mentioned terms "perforated plate needing a flowing-out path of the slurry therefrom other than small holes thereof" mean that the slurry substantially does not flow through the small holes thereof and needs a flowing-out path other than the small holes such as downcomer 2 shown in FIG. 1 or withdrawing pipe 27 in FIG. 5, as described later. Thus the diameter of the small holes is suitably 5 mm or smaller, preferably 0.5 to 2 mm, more preferably 0.7 to 1.5 mm. The free cross-section of the perforated plate (proportion of the total cross-sectional area of holes relative to the area of the perforated plate) is 0.01 to 10%, preferably 0.04 to 4%, more preferably 0.2 to 2%. If the free cross-section of the perforated plate is lower than these ranges, agitation of vinyl chloride resin particles contained in the slurry on the perforated plate is insufficient. The diameter of the holes or the free cross-section of the perforated plate more than the above-mentioned ranges is unsuitable, since increase in unnecessary steam consumption as well as liquid leakage occurs.

In addition, it is presumed that the fact that the diameter of the holes is small as mentioned above, is a cause of clogging of holes which is liable to occur.

If a downcomer is provided for the above-mentioned flowing-out path, in order to retain the slurry on the perforated plate for a sufficient time, weir plates are usually provided around and above the downcomer. These weir plates either may be or may not be integral with the downcomer.

On the perforated plate, side plates for forming a groove-like flow path may be stood so that the slurry can flow in a state close to piston-flow from its inlet to outlet. In this case, since the distribution of retention time of treated vinyl chloride resin particles is narrow, the amount of particles having passed through the column in a shorter time and being insufficient in the removal of VC monomer is reduced, and the amount of particles retained in the column for a longer time, discolored and degraded is also reduced.

If the perforated plate needing a flowing-out path of slurry as mentioned above is provided in at least one, in the above-mentioned vessel (including a column), the above-mentioned hot water washing in the present invention is applicable. If another perforated plate (which may have no flowing-out path as mentioned above and permit the slurry to flow down by way of weeping (i.e. through the small holes of the plate)) is provided below the above-mentioned perforated plate needing a flowing-out path, the present invention exhibits a great effectiveness. However, even if such another perforated plate is not provided, and hence a phenomenon that drops of the slurry splash from below up to the lower surface of the perforated plate needing a flowing-out path as mentioned above does not occur, application of the hot water washing of the present invention is also effective, since it often occurs that the slurry descends through the small holes of the perforated plate needing a flowing-out path of slurry as mentioned above, due to variation of steam pressure, and particles of vinyl chloride resin adhere to the lower surface of the perforated plate as well as the side wall surface of the small holes. In this case, a slurry-withdrawing pipe to the outside of the column is employed as the above-mentioned flowing-out path of slurry.

Nevertheless, it may be usual to employ a plurality of perforated plates having a flowing-out path as mentioned above, incorporated inside the column.

The diameter of the column containing the perforated plate of the present invention has no particular limitation, but those of about 0.3 to 3 m, particularly about 0.5 to 2 m are convenient for use. The height of the column also has no particular limitation, but those of about 5 to 20 times, particularly about 5 to 15 times the diameter of the column are convenient for use.

The slurry of the present invention contains an aqueous dispersing medium and vinyl chloride resin particles and also contains VC monomer in an amount which is desired to be removed therefrom.

The above-mentioned vinyl chloride resin refers to polymers containing polymerized vinyl chloride, and includes vinyl chloride homopolymer, copolymers of vinyl chloride with other vinyl monomer such as vinyl acetate, alkyl vinyl ether, olefin, acrylate, methacrylate, vinylidene chloride, acrylonitrile, etc. and graft polymers of vinyl chloride onto olefinic polymers. Typically, polymers containing 50% by weight or more of polymerized vinyl chloride are mentioned.

The above-mentioned aqueous dispersion may contain, besides water, a suspending agent such as polyvinyl alcohol, methyl cellulose, etc., a buffer, particle size-modifier, scale adhesion-inhibitor, etc., added to the polymerization system at the time of polymerization for producing the above-mentioned vinyl chloride resins. The above-mentioned aqueous dispersing medium may also contain an emulsifier, but, in this case, it is desirable to additionally contain a defoaming agent.

VC monomer may be contained in any amount in the slurry so long as its removal is desired. The slurry to be treated in the present invention is usually a slurry obtained by polymerizing VC monomer or VC monomer plus another monomer in an aqueous dispersing medium and then reducing the pressure inside the reaction system down to the atmospheric one to withdraw gaseous monomer(s), and VC monomer absorbed in or adsorbed to the polymer particles is present usually in an amount of 40,000 to 500 ppm in the slurry. However, the present invention is also applicable to the slurry sent to a slurry storage tank midway during reduction of the pressure of the reaction system after completion of polymerization, down to the atmospheric one, or in some case, after the polymerization has been terminated at an optional percentage polymerization. In such a slurry, VC monomer absorbed in or adsorbed to the polymer particles is often present in an amount of 15%.

The content of vinyl chloride resin in the slurry (hereinafter often abbreviated merely to slurry concentration) is suitably 5 to 45% by weight, preferably 10 to 40% by weight, more preferably 15 to 30% by weight. If it exceeds these ranges, the fluidity of the slurry is inferior, while if it is less than them, the capacity of the column employed in the present invention is lowered, and on the other hand, there is no particular improvement in the effectiveness of VC monomer removal.

The temperature of the slurry during the steam treatment on the perforated plate needing a flowing-out path as mentioned above is suitably 60° C. or higher, preferably 70° C. or higher, more preferably 80° C. or higher, while it is suitably 130° C. or lower, preferably 120° C. or lower, more preferably 110° C. or lower. The higher the temperature, the easier the escape of VC monomer contained in the slurry or vinyl chloride resin particles therein to the gas phase, while accompanied by steam, and on the other hand, if the temperature is too high, vinyl resin particles in the slurry are colored or thermally degraded.

When the slurry is fed to the vessel (including a column) provided with the perforated plate needing a flowing-out path as mentioned above, it is preferable to preheat the slurry to 50° to 100° C. This preheating is well effected by heat-exchange between this slurry and the slurry issuing from the vessel. On the other hand, rapid cooling of the slurry issuing from the vessel is also effected. The temperature of the slurry issuing from the vessel is preferably 70° to 130° C.

When the temperature of the slurry inside the vessel is in the range of 70° C. to 130° C., the pressure inside the vessel amounts to about 0.2 to 3 Kg/cm$^2$ (absolute).

The residence time of the slurry in the vessel is suitably one minute or longer, preferably two minutes or longer, more preferably 3 minutes or longer. On the other hand, it is suitably 90 minutes or shorter, preferably 60 minutes or shorter, more preferably 30 minutes or shorter. The longer the residence time, the greater the removal effectiveness of VC monomer from the slurry or vinyl chloride resin particles therein. On the other hand, if it is too long, the resin particles are colored or degraded.

The amount of the slurry fed to the perforated plate needing a flowing-out path as mentioned above (hence usually to the vessel provided with the plate) is 1 to 300 m$^3$, preferably 4 to 100 m$^3$ per m$^2$ of the area of the perforated plate, per hour.

The amount of steam blown into the slurry on the perforated plate needing a flowing-out path as mentioned above, or the amount of steam fed to the vessel provided with the perforated plate is suitably 1 to 100 Kg, preferably 5 to 50 Kg, per m$^3$ of the slurry. By this blow-in of steam, it is possible to elevate the slurry temperature or maintain it at a high temperature, agitate the resin particles in the slurry and thereby prevent them from sinking and further promote the transfer of VC monomer in the slurry into gas phase. The prevention of sinking of the resin particles is important for preventing the residence time distribution of the particles from becoming broader and also for removing the monomer contained in the particles and the surrounding aqueous phase. For this purpose, it is desirable that the amount of steam blown-in is not too small. On the other hand, if the amount is too large, the results are also undesirable since no particular effectiveness upon the removal of the monomer in the slurry is not only obtained, but also slurry splash increases or flooding occurs.

The main cause of the adhesion of vinyl chloride resin particles onto the lower surface of the perforated plate needing a flowing-out path of slurry as mentioned above or the side wall surface of the small holes is presumed to consist in that slurry drops splash from below the perforated plate and slurry descends through the small holes from thereabove due to variation in the steam pressure. According to the present invention, such adhered resin is washed away by injected hot water during the steam treatment of the slurry.

The temperature of this hot water is suitably 10° C. higher to 10° C. lower than that of the slurry on the perforated plate whose lower surface is washed with the hot water. If the temperature of the hot water exceeds a temperature 10° C. higher than that of the slurry, there is a possibility that the resin in the slurry is colored or degraded. On the other hand, if the temperature is lower than a temperature 10° C. lower than that of the slurry, bubbling in the slurry is reduced or does not occur, resulting in reduction of the effectiveness of VC monomer removal from the slurry, and also sinking of resin particles in the slurry to cause clogging of the holes of the perforated plate; hence such a temperature is also undesirable.

The hot water injection to the lower surface of the perforated plate is carried out continuously or intermittently. The intermittent injection is suitably carried out continuously during at least one second, preferably at least 5 seconds, more preferably at least 15 seconds. If the time is shorter than the above, adhered resin is often not sufficiently washed away. On the other hand, injection-discontinued time is suitably 90 minutes or shorter, preferably 60 minutes or shorter. If the discontinued time is longer, the amount of resin which is not washed away by the injection increases. Continuous injection of hot water (including both the case of intermittent injection and the case of continuous injection) includes an intermittent injection containing a discontinued period shorter than about one second.

The hot water injection may be carried out by spouting hot water from a spouting port provided in a vessel (corresponding to a hot water spouting member for washing referred to in the description of the drawing mentioned later) containing hot water under a pressure higher than that in the space which the lower surface of the perforated plate to be injected faces.

In order to impart a sufficient spouting rate and hence washing power to the hot water, the pressure difference between the pressure of the hot water contained in the above-mentioned vessel containing hot water and the pressure in the space which the lower surface of the perforated plate faces, is suitably 0.2 Kg/cm$^2$ or higher, preferably 0.5 Kg/cm$^2$ or higher. Too high a pressure difference is uneconomical, because sufficient strengthes of the perforated plate equipments for hot water feed such as pump, pipe, etc. are required. Thus the pressure difference is suitably 300 Kg/cm$^2$ or lower, preferably 50 Kg/cm$^2$ or lower.

As for the distance between the hot water-spouting port and the lower surface of the perforated plate which the port faces, the shorter the distance, the higher the hot water rate at which the hot water collides with the lower surface of the perforated plate, and hence the greater the effectiveness of washing away of adhered resin. However, in this case, in order to cause hot water to uniformly collide with the lower surface of the perforated plate, it is necessary to arrange a large number of spouting ports over a wide range, resulting in a complicated apparatus. On the other hand, it should be avoided to increase the height of the column provided with the perforated plate to an unnecessary extent. Taking into account these matters, the above-mentioned distance is suitably 50 to 500 mm, preferably 100 to 300 mm.

The hot water spouting port may be provided so that a number thereof are arranged in line in a pipe of circular, straight or other shape. Alternatively it may be collectively arranged as in the case of shower head. Further, it may be arranged in suitable combination of the above-mentioned arrangements. Pipe, shower head or the like member provided with the hot water-spouting port will be hereinafter referred to as hot water-spouting member.

The spouting port may have either circular shape or slit-like shape. In the case of circular shape port, its diameter is suitably 1 to 8 mm, preferably 3 to 5 mm. If the spouting port is too small, the spouted hot water forms mist, resulting in reduction of washing power, while if it is too large, the rate of spouted hot water is reduced, resulting in reduction of washing power, or necessity of feed of an excessive amount of hot water in order to keep a high rate. For the same reason, in the case of slit-like spouting port, its width is suitably 0.5 to 8 mm, preferably 1 to 5 mm.

The spouting direction of hot water is suitably a direction of 10° to 60°, preferably 30° to 45° inclined to the vertical direction. The directions of hot water injected toward the lower surface of a perforated plate are not always necessary to be all the same, but it is rather preferable to employ a suitable combination of two or more, different directions.

In order to impart to the above-mentioned hot water, a sufficient spouting rate and hence a washing power, the amount of hot water injected is suitably 10 to 1,000 l/area of perforated plate (m²), preferably 30 to 500 l/area of perforated plate (m²), in terms of instantaneous value. If the amount of hot water injected is less than the above-mentioned range, a sufficient washing is impossible, while if it exceeds the range, the amount of hot water consumed increases, resulting in uneconomy, and also no washing effectiveness corresponding to the increase in the amount, and further if another perforated plate for the same slurry treatment is provided below the perforated plate having the lower surface washed as mentioned above, there is a possibility that the residence time of slurry on the lower plate is shortened to make the treatment insufficient.

In the case of a column provided with a plurality of perforated plates, each having a downcomer for slurry, it is preferable rather to carry out the injection of hot water onto the lower surfaces of these perforated plates, first onto one perforated plate to a few, and next onto another perforated plate to another few, successively, than to carry out it all at once, since the former procedure does not alter the residence time of slurry in the column so much. For the same reason, it is preferable to carry out the former procedure so that after the most part of hot water injected onto one perforated plate to a few has been withdrawn from the column to the outside, hot water is injected onto another perforated plate to another few.

The present invention will be further described referring to the accompanying drawings.

BRIEF DESCRIPTION OF THE DRAWINGS

In FIG. 1, numeral 1 shows a perforated plate; 2, a downcomer; 3, side plates for forming a groove-like path for flowing slurry 4 in a state close to piston-flow; 5, column shell; 6, a circular pipe as a hot water-spouting member for washing; 7, a pipe for feeding hot water to the circular pipe; 8, a valve provided in the pipe 7; and 9, a supporting member for the circular pipe 6.

In FIG. 2, numeral 10 shows small holes for spouting hot water. In this figure, a and b, each show an angle of the spouting direction of hot water from the small holes, relative to the vertical direction, respectively, and the suitable range of these angles are as mentioned above.

Figure 1:
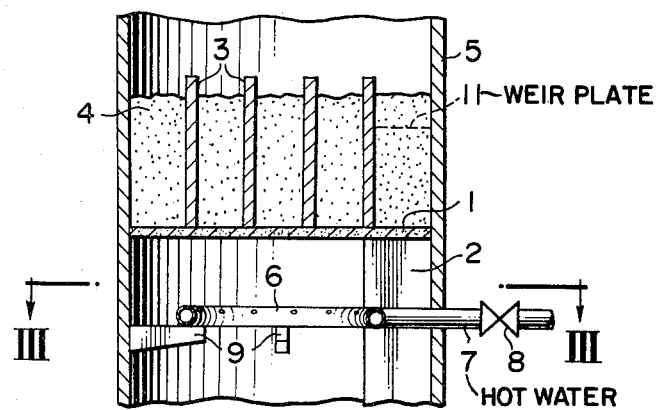
FIG. 1 shows a vertically cross-sectional view of a perforated plate provided in a column to which the present invention is applied, and having a downcomer, and a hot water-spouting member for washing the lower surface of the plate with hot water.
Figure 3:
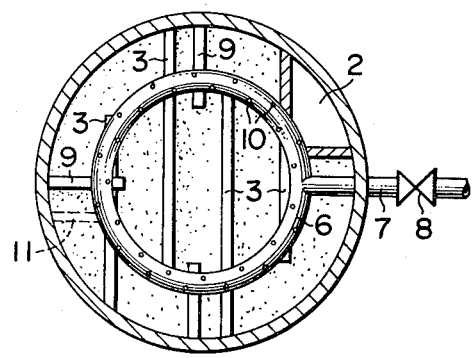
FIG. 3 shows a cross-sectional plan view of the column of FIG. 1 taken along the line III—III thereof.
Figure 2:
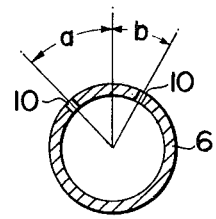
FIG. 2 shows an enlarged, horizontally cross-sectional view of a circular pipe as said hot water-spouting member for washing.

Numerals shown in FIG. 3 have the same meanings as in FIG. 1. In this figure, numeral 11 shows a weir plate for overflowing slurry, which is shown by dotted lines since this is concealed by slurry.

Figure 4:
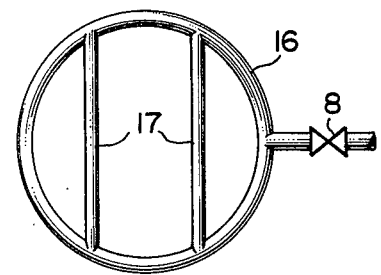
FIG. 4 shows a plan view of another embodiment of hot water-spouting member for washing.

In FIG. 4, a hot water-spouting member for washing consists of a circular pipe 16 and a straight line-form pipe 17.

Figure 5:
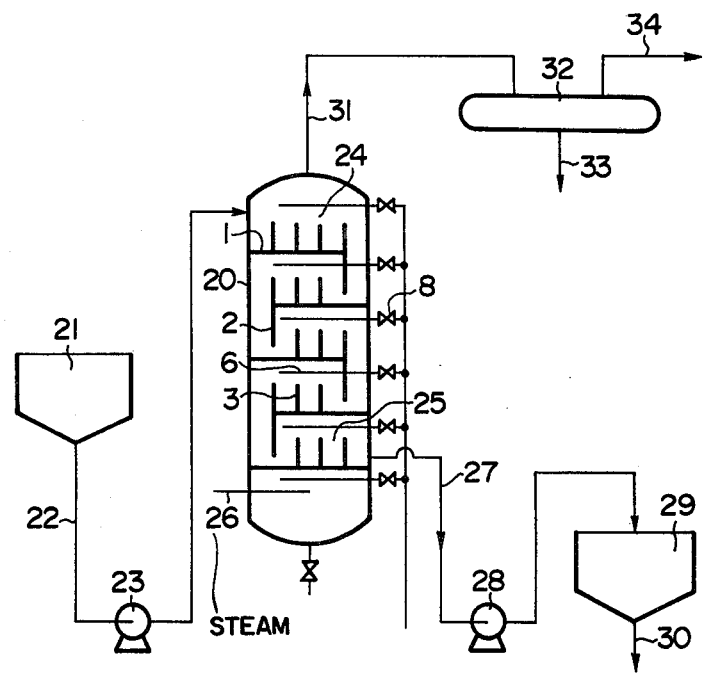
FIG. 5 shows a schematical view illustrating the slurry-treating process to which the present invention is applied.

In FIG. 5, numeral 20 shows a column provided with perforated plates (often referred to hereinafter as plate column). In this column are provided five perforated plates 1 which are equipped with a downcomer 2 or a slurry-withdrawing pipe 27 and on which side plates 3 for forming a groove-like flow path are provided. Below the respective perforated plates are provided hot water-spouting members 6. The lowermost hot water-spouting member may be not always provided. If the member is absent, only the lowermost perforated plate will be free from application of the present invention.

Next, the process shown in FIG. 5 will be briefly described.

In this figure, numeral 21 shows a tank for vinyl chloride resin slurry which is usually provided with a slurry-receiving piping, a stirring means for preventing resin powder from sinking and a water seal means for intercepting the gas phase part from the outside air (these means being not shown). The volume of the tank is not limited, but it is preferably an amount corresponding to one to several times the slurry-treating capacity of the plate column 20, since the operation of the column is carried out preferably continuously for a long time in order to avoid time loss from stop of operation till attainment to stationary operational conditions at the time of reoperation, as well as insufficient treatment of slurry till the stationary operation, and on the other hand, receipt of slurry into the slurry tank 21 is often intermittently carried out due to the type vinyl chloride polymerization method, etc. The slurry is fed via a feeding piping 22 to the plate column 20 and a pump 23 to the column top chamber 24 of the column 20. The perforated plate of the column top chamber 24 has the same structure as the above-mentioned one in FIG. 1, and the vinyl chloride resin slurry on the perforated plate is heated by a vapor mixture of steam and monomer blown in through a number of small holes of the perforated plate from a plate chamber just therebelow, whereby a part of VC monomer contained in the slurry is separated and vaporized. The slurry overflows the weir 11 of the perforated plate, moves to the perforated plate in the plate chamber just therebelow, where it is similarly heated, and is led to a column bottom chamber 25 on the lowermost perforated plate, while its temperature is successively elevated during the movement. In a chamber below the column bottom chamber 25, steam is flowed thereinto through a blow-in port 26.

During the above movement of slurry, the lower surface of the respective perforated plates is washed with hot water injected from a hot water spouting member 6.

The resulting treated slurry is withdrawn from the column bottom chamber 25 and led via a withdrawing pipe 27 and a pump 28 to a treated slurry-receiving tank 29. The treated slurry is sent via a withdrawing pipe 30 to dehydration and drying steps (not shown), but if VC monomer separation is insufficient, a part or the total of the treated slurry may be circulated to the slurry tank 21. On the other hand, the vapor mixture generated in the column top chamber is withdrawn, led through a vapor-withdrawing pipe 31 to a compressor (not shown) where it is compressed, and led to a condenser 32 where it is left at a temperature higher than freezing point of water under pressure. Water is condensed therein and the resulting separated water and VC monomer are withdrawn through withdrawing pipes 33 and 34, respectively. Withdrawn VC monomer can be reused for polymerization as it is, or if necessary, after rectification according to known process. In addition, it goes without saying that before the slurry is directly treated in the plate column 20 shown in FIG. 5, the slurry may be preliminarily treated by a simpler stripper than the above plate column, e.g. flash column. p According to the present invention, it is also possible to inhibit formation of colored particles often found in the slurry after usual steam treatment, the cause of which formation is presumed to consist in that VC resin particles adhere onto the lower surface of perforated plate during usual steam treatment of VC resin slurry and these particles are exposed to a high temperature for a long time.

The present invention will be described referring to the following Examples.

EXAMPLES 1~4

Employing a plate column provided with five perforated plates (each, the diameter of small holes: 1 mm$\phi$, the free cross-section of the perforated plate: 0.2%) having a shape as shown in FIG. 1 and constructed as shown in FIG. 5, various slurries (slurry concentration: 25% by weight, VC monomer concentration: 8,000 ppm) shown in Table 1 were subjected to steam treatment according to the process of FIG. 5. In the plate column employed, the capacity per one plate is 375 l; the distance between adjacent plates, 75 cm; the height of weir inside the plate, 35 cm; and the width of flow path, 17 cm.

A slurry (s.g. 1.05) preheated to 90° C. in a slurry tank 21 of FIG. 5 was fed to the column top chamber 24 of the plate column 20 of FIG. 5 at a rate of 9.52 m$^3$/hr, while steam having a temperature of 110° C. was blown into a chamber below the column bottom chamber through a blow-in pipe 26 at a rate of 375 Kg/hr. The residence time of the slurry was 10 minutes. The slurry successively flowing down inside the plate column and heated to 100° C. was withdrawn from the lowermost plate of the plate column 20 and led via an exit pipe 27 and a pump 28 to a slurry-receiving tank 29, during which the slurry was cooled down to 50° C. by means of a cooler (not shown).

VC monomer concentration in this slurry is shown in Table 1.

On the other hand, a vapor mixture of steam with VC monomer generated in the column top chamber 24 of the plate column 20 was withdrawn, passed through an exit pipe 31, pressurized (compressor, not shown) and led into a condenser 32 from which condensed water and gaseous monomer were withdrawn through withdrawing pipes 33 and 34, respectively.

In the above process, a circular pipe as shown in FIG. 3 was employed as a hot water injecting member for washing. Each of the hot water spouting openings had a circular shape of 4 mm in diameter and included those directed toward the center of the column and those directed toward the column shell side, the angles thereof relative to the vertical direction being 45° and 30°, respectively, and the distance from the lower surface of the perforated plate being 15 cm. Hot water was injected under the following conditions to wash the lower surface of the plate and the inner surface of the shell part:

Temperature of hot water for washing—those indicated in Table 1; amount of hot water—50 l/area of perforated plate (m$^2$)/min. per one plate; frequency of washing—once/hr. per one plate; and washing time per one washing—15 seconds.

110 Kg/hr of condensed water and 19.99 Kg/hr of VC monomer were recovered. On the other hand, no VC monomer was detected in the waste water after continuous centrifugal dehydration of slurry.

Further, when the dehydrated vinyl chloride resin was subjected to gas stream drying according to known method, VC monomer concentration in the exhaust gas was 0.1 ppm, and that in the dried vinyl chloride resin was lower than 1 ppm.

The above-mentioned operation could be continued over 10 days without any obstacle, and no difference in the effectiveness of monomer separation and removal was observed between the initial period and the final period.

COMPARATIVE EXAMPLES 1~4

Employing the same apparatus as employed in Example 1 and under the same operational conditions as in Example 1, a slurry of a straight vinyl chloride resin (average polymerization degree: p=700) (resin concentration: 25% by weight, VC monomer concentration: 8,000 ppm) was subjected to steam treatment except that the temperature and amount of hot water for washing and the washing frequency were varied as indicated in Table 2.

The resulting treated slurry was subjected to centrifugal dehydration as in Example 1 and the resulting dehydrated vinyl chloride resin was subjected to air-borne drying. As a result, VC monomer concentrations in the exhaust gas and the dried vinyl chloride resin were not different from those in Example 1, except for Comparative example 4, but the number of different matters in the dried resin was much more than those in Example 1, and the operable time was 24 hours or shorter. On the other hand, in Comparative example 4, the operation of the column became practically impossible through the hot water washing.

TABLE 1

| | | (Examples 1~4) | | | |
|---|---|---|---|---|---|
| | | Example 1 Straight ($\bar{p}$ = 700) | Example 2 Straight ($\bar{p}$ = 1300) | Example 3 Vinyl acetate copolymer | Example 4 Vinyl ether copolymer |
| Kind of resin used | | | | | |
| Temp. of hot water for washing (°C.) | 1st plate (96° C.)* | 90° C. | same as left temp. | same as left temp. | same as left temp. |
| | 2nd plate (97° C.) | 91° C. | same as left temp. | same as left temp. | same as left temp. |
| | 3rd plate (98° C.) | 92° C. | same as left temp. | same as left temp. | same as left temp. |
| | 4th plate (99° C.) | 93° C. | same as left temp. | same as left temp. | same as left temp. |

TABLE 1-continued
(Examples 1~4)

| Kind of resin used | Example 1 Straight ($\bar{p}$ = 700) | Example 2 Straight ($\bar{p}$ = 1300) | Example 3 Vinyl acetate copolymer | Example 4 Vinyl ether copolymer |
|---|---|---|---|---|
| 5th plate (100° C.) | 94° C. | same as left temp. | same as left temp. | same as left temp. |
| Amount of residual monomer in treated slurry (ppm) | 5 | 1 | 2 | 3 |
| Amount of residual monomer in dried resin (ppm) | or less | left amount | left amount | left amount |
| Number of abnormal resin particles** per 100 g | 7 | 5 | 8 | 7 |
| Continuously operable time | 10 days or longer | same as left time | same as left time | same as left time |

*Temperatures in the parentheses show those of treated slurry. This applies to Table 2.
**Abnormal resin particles mean colored particles and gel-form particles.

TABLE 2
(Comparative examples 1~4)

| | | Comp. ex. 1 | Comp. ex. 2 | Comp. ex. 3 | Comp. ex. 4 |
|---|---|---|---|---|---|
| Amount of washing water l/m²/min. | | 0 | 5 1 | 50 1 | 50 1 |
| Temp. of hot water for washing (°C.) | 1st plate (96° C.) | — | 90° C. | Same as left temp. | 81° C. |
| | 2nd plate (97° C.) | — | 91° C. | Same as left temp. | 82° C. |
| | 3rd plate (98° C.) | — | 92° C. | Same as left temp. | 83° C. |
| | 4th plate (99° C.) | — | 93° C. | Same as left temp. | 84° C. |
| | 5th plate (100° C.) | — | 94° C. | Same as left temp. | 85° C. |
| Washing frequency | | — | once/hr. | once/2 hrs. | once/hr. |
| Residual monomer in slurry | | 3 ppm | 5 ppm | 5 ppm | — |
| Residual monomer in dried resin | | 1 ppm or less | 1 ppm or less | 1 ppm or less | — |
| Number of abnormal resin particles per 100 g | | 100 or more | 100 or more | 45 | — |
| Continuously operable time | | 2 hrs. | 5 hrs. | 24 hrs. | 1 hr. |

What is claimed is:

1. In the process of removing vinyl chloride monomer from a vinyl chloride resin slurry by feeding said slurry into a zone provided with at least one perforated plate having a plurality of small holes and treating said slurry on said perforated plate with steam blown upwardly through said small holes,
the improvement which comprises, during said steam treatment, washing the lower surface of each said perforated plate with hot water injected against said lower surface of said perforated plate.

2. A process according to claim 1 wherein the temperature of said hot water is in the range of from a temperature lower by 10° C. to a temperature higher by 10° C. than the temperature of said slurry on said perforated plate.

3. A process according to claim 1 wherein the hot water injection is intermittently carried out at intervals of 90 minutes or less.

4. A process according to claim 3 wherein the interval is 60 minutes or less.

5. A process according to claim 3 or claim 4 wherein the hot water injection between intervals is continuously carried out for at least one second.

6. A process according to claim 5 wherein each hot water injection is continuously carried out for at least 5 seconds.

7. A process according to claim 1 wherein the amount of said hot water injected is 10 to 1,000 liters per square meter of perforated plate per minute.

8. A process according to claim 7 wherein said amount is 30 to 500 liters per square meter of perforated plate per minute.

9. A process according to claim 1 wherein said slurry on said perforated plate is caused to flow in a state close to piston flow by passing it through a groove-like flow path from its entrance until its exit from the plate.

10. A process according to claim 1 wherein the diameter of said small holes is 5 mm or less.

11. A process according to claim 1 wherein there are at least two perforated plates.

12. A process according to claim 1 wherein said zone is a column provided with a plurality of perforated plates.

13. A process according to claim 12 wherein while some of said perforated plates are being washed other perforated plates are not being washed.

14. A process according to claim 1 wherein the temperature of said slurry is 60° to 130° C.

* * * * *